United States Patent
Bethke

(10) Patent No.: US 8,919,128 B2
(45) Date of Patent: Dec. 30, 2014

(54) METHOD AND DEVICE FOR DAMPING THERMOACOUSTIC OSCILLATIONS, IN PARTICULAR IN A GAS TURBINE

(75) Inventor: Sven Bethke, Düsseldorf (DE)

(73) Assignee: Siemens Aktiengesellschaft, Munich (DE)

( * ) Notice: Subject to any disclaimer, the term of this patent is extended or adjusted under 35 U.S.C. 154(b) by 1886 days.

(21) Appl. No.: 11/991,978

(22) PCT Filed: Aug. 8, 2006

(86) PCT No.: PCT/EP2006/065137
§ 371 (c)(1),
(2), (4) Date: Aug. 17, 2009

(87) PCT Pub. No.: WO2007/031376
PCT Pub. Date: Mar. 22, 2007

(65) Prior Publication Data
US 2009/0293481 A1    Dec. 3, 2009

(30) Foreign Application Priority Data
Sep. 13, 2005    (EP) .................................. 05019897

(51) Int. Cl.
*F02C 7/24*    (2006.01)
*F02C 7/04*    (2006.01)

(52) U.S. Cl.
CPC ............... *F02C 7/04* (2013.01); *F23M 99/005* (2013.01); *F05D 2260/962* (2013.01); *F23R 2900/00013* (2013.01)
USPC ............... 60/772; 60/725; 181/238; 181/241

(58) Field of Classification Search
CPC ............... F05D 2260/962; F05D 2260/963; F23M 99/005; F23R 2900/00013
USPC ................... 60/772, 725; 181/213, 241, 238
See application file for complete search history.

(56) References Cited

U.S. PATENT DOCUMENTS

| 4,135,603 | A * | 1/1979 | Dean et al. ............... 181/224 |
| 4,600,078 | A * | 7/1986 | Wirt ............... 181/286 |
| 6,199,657 | B1 | 3/2001 | Misawa et al. |
| 6,370,879 | B1 * | 4/2002 | Stalder et al. ............... 60/725 |
| 7,104,065 | B2 | 9/2006 | Benz et al. |
| 7,320,222 | B2 * | 1/2008 | Flohr et al. ............... 60/725 |
| 2004/0045767 | A1 * | 3/2004 | Byrne et al. ............... 181/241 |
| 2005/0223707 | A1 * | 10/2005 | Ikeda et al. ............... 60/725 |

FOREIGN PATENT DOCUMENTS

| CH | 692 095 A5 | 1/2002 |
| DE | 44 14 232 A1 | 10/1995 |
| DE | 196 40 980 A1 | 4/1998 |
| DE | 10 2004 006 647 A1 | 8/2004 |
| EP | 0 974 788 A1 | 1/2000 |
| EP | 1 557 609 A1 | 7/2005 |
| EP | 1 568 869 A1 | 8/2005 |
| GB | 2288660 A * | 10/1995 |
| JP | 06076649 A | 3/1994 |
| JP | 6-076649 U | 10/1994 |
| JP | 2000120499 A | 4/2000 |
| WO | 03023281 A1 | 3/2003 |

OTHER PUBLICATIONS

DE 102004006647 machine translation (original patent date Feb. 2004).*

* cited by examiner

*Primary Examiner* — Ted Kim

(57) ABSTRACT

The invention relates to a method for damping thermo-acoustic oscillations via a resonator having a resonator volume with thermo-acoustic oscillations induced in a cavity inclined to thermo-acoustic oscillations, and at least some of the thermo-acoustic oscillations being output from the cavity and being input into the resonator volume, with damping oscillations produced in the resonator volume, which are matched to the thermo-acoustic oscillations, with at least some of the damping oscillations being input into the cavity such that the damping oscillations and the thermo-acoustic oscillations overlap in an overlap area, and the oscillations being largely cancelled out. The invention relates to an apparatus for damping thermo-acoustic oscillations in a cavity, comprising a resonator with a resonator volume and a cavity. The invention also relates to a combustion chamber together with a method and an apparatus according to the invention, and to a gas turbine having a combustion chamber.

11 Claims, 2 Drawing Sheets

METHOD AND DEVICE FOR DAMPING THERMOACOUSTIC OSCILLATIONS, IN PARTICULAR IN A GAS TURBINE

CROSS REFERENCE TO RELATED APPLICATIONS

This application is the US National Stage of International Application No. PCT/EP2006/065137, filed Aug. 8, 2006 and claims the benefit thereof. The International Application claims the benefits of European application No. 05019897.7 filed Sep. 13, 2005, both of the applications are incorporated by reference herein in their entirety.

FIELD OF INVENTION

The invention relates to a method for damping thermoacoustic oscillations by means of a resonator, which has a resonator volume, and a device for damping thermoacoustic oscillations in a cavity that is capable of oscillation, comprising a resonator with a resonator volume and a cavity.

Both the method and device are intended to be deployable in a combustion chamber for gas turbines.

BACKGROUND OF THE INVENTION

A gas turbine unit comprises for example a compressor, a combustion chamber and a turbine. Intake air is compressed in the compressor and then mixed with a fuel. The mixture is burned in the combustion chamber, with the combustion waste gases being fed to the turbine. The turbine extracts thermal energy from the combustion waste gases and converts it to mechanical energy.

During combustion of the mixture thermoacoustic oscillations occur in the combustion chamber and are propagated in a wave. A standing wave can develop in the combustion chamber at a resonant frequency, which damages the combustion chamber in an irreversible manner. These thermoacoustic problems represent a problem during the design and operation of new combustion chambers, combustion chamber parts and burners for such gas turbines.

To reduce thermoacoustic oscillations therefore Helmholtz resonators for example are deployed in the prior art to damp the oscillations. A Helmholtz resonator generally comprises a volume with air contained therein or a different gas. Connected to the volume is a pipe, known as the resonator pipe, in which air or gas is similarly present, and which opens into the combustion chamber. The air or gas in the volume and in the resonator pipe form a spring-mass system, with the air or gas in the volume forming the spring and the air or gas in the resonator pipe forming the mass. When the spring-mass system oscillates at a resonant frequency, which is determined by the volume, the cross-sectional surface of the resonator pipe and the length of the resonator pipe, the Helmholtz resonator behaves in the manner of an opening of infinite length, which makes it impossible for a standing wave to form at resonant frequency.

However a Helmholtz resonator has a fixed resonant frequency. The occurrence of thermoacoustic oscillations can therefore only be effectively suppressed for frequencies, which correspond to the resonant frequency of the Helmholtz resonator or are close to it. The effect of the Helmholtz resonator is significantly reduced for frequencies that differ from it.

SUMMARY OF INVENTION

The object of the invention is to specify an improved method and device for damping thermoacoustic oscillations, having an effective action and being flexible in respect of changes in the thermoacoustic oscillations to be damped. The method and device are to be suitable for use in a combustion chamber for gas turbines.

According to the invention the object relating to the method is achieved by a method for damping thermoacoustic oscillations by means of a resonator, which has a resonator volume, with thermoacoustic oscillations being induced in a cavity which has a tendency to thermoacoustic oscillation and at least some of the thermoacoustic oscillations being coupled out of the cavity and coupled into the resonator volume, so that damping oscillations are produced in the resonator volume, which are matched to the thermoacoustic oscillations, with at least some of the damping oscillations being coupled into the cavity in such a manner that the damping oscillations and thermoacoustic oscillations overlap in an overlap region and with the oscillations largely being canceled out at least in the overlap region.

The invention is based on the knowledge that a difference between the actual frequency of the thermoacoustic oscillations in a cavity capable of oscillation and the previously calculated resonant frequency of the resonator is characterized by a significant loss of damping efficiency. Such differences can be caused for example by mechanical changes in the cavity, for example changes in a combustion chamber or other thermal or other types of interference. This also reduces acoustic damping, so the thermoacoustic oscillations increase. This can result in an escalating interaction between thermal and acoustic interference, causing significant loading of the cavity, for example a combustion chamber. Until now the resonators used have been designed for a fixed and predetermined resonant frequency and can therefore no longer achieve the required damping effect when there are changes in the acoustic characteristics of oscillation-capable cavity.

Based on this knowledge, the inventive method for damping thermoacoustic oscillations in a cavity first prevents an unwanted drop in damping efficiency. This is done by tailoring the resonant frequency of the resonator to the currently prevailing frequency of the thermoacoustic oscillations in the cavity.

The basic principle of the invention is that on the one hand the intended excitation of the resonator is achieved and on the other hand said excitation takes place with the aid of the thermoacoustic oscillations themselves. In this instance too the resonator behaves in the manner of an ideal resonator. This happens because some of the thermoacoustic oscillations are coupled into the resonator in such a manner that it produces excitation of the damping oscillations in the resonator and in such a manner that when the damping oscillations produced are fed back into the cavity, they are largely canceled out at least in the overlap region of the thermoacoustic oscillations and damping oscillations. Some of the thermoacoustic oscillations of the cavity are even used to excite the resonator volume. This means that when the frequency of the thermoacoustic oscillations changes, there is therefore also a change in the frequency of the coupling out and coupling into the resonator of the oscillations, with the result that the damping oscillations of the resonator that are produced also change. The prior coupling out of the thermoacoustic oscillations means that the resonator is also excited with a time delay in relation to the thermoacoustic oscillations. This time delay is set so that the damping oscillations produced are canceled out by the thermoacoustic oscillations in the overlap region (destructive interference). The time delay results from the propagation time of the coupled out thermoacoustic oscillations from the cavity to the resonator.

This method therefore allows subsequent matching of the resonator to the respectively prevailing thermoacoustic oscillations in the cavity. This tailoring of the damping oscillations to the acoustic oscillations and the local cancellation prevents a standing wave developing in the cavity at resonant frequency, even if the frequency of the thermoacoustic oscillations differs from the previously calculated frequencies of the required resonant oscillations of the resonator due to external influences. This prevents any resonance catastrophes in the cavity, which could damage the cavity or the walls bounding the cavity.

Use of the cavity oscillations to excite the resonator volume also represents a convenient and simple solution to resonator excitation. Additional exciters for the resonator are not required.

In a preferred embodiment the damping oscillations are matched in phase opposition in respect of the thermoacoustic oscillations. This results in damping of the thermoacoustic oscillations.

The phase, wavelength and frequency of the damping oscillations are preferably set. This results in total cancellation of the two oscillations in the overlap region.

In a preferred embodiment the phase of the damping oscillations in the overlap region is set by influencing the propagation time of the thermoacoustic oscillations coupled out of the cavity. This allows simple subsequent matching of the resonator to the thermoacoustic oscillations. Simple setting capability is particularly advantageous for example in the case of cavities exposed to very different operating temperatures, since the natural frequencies of the cavity are displaced in this process due to the changed thermoacoustic characteristics of the cavity.

To achieve a temporally continuous cancellation in the overlap region, the damping oscillations are preferably adjusted to the thermoacoustic oscillations in situ. This quickly ensures significant cancellation of the two oscillations when external influences fluctuate considerably. The in situ adjustment can be effected by means of a control circuit, which constantly readjusts the time delay and therefore the phase to achieve largely total cancellation.

In a preferred embodiment the damping oscillations are set over a frequency range between 10 Hz and 400 Hz. This large range for setting the frequency allows a plurality of deployment possibilities and possible variations of the cavity. This frequency range is particularly interesting in the case of cavities embodied as combustion chambers, in that thermoacoustic oscillations can form and be propagated due to combustion instabilities.

The thermoacoustic oscillations are preferably induced in the cavity by combustion oscillations. Hot gases for example, which are then used to generate energy, are produced during combustion of a suitable fuel/gas mixture in the cavity.

According to the invention the object relating to the device is achieved by a device for damping thermoacoustic oscillations in a cavity that is capable of oscillation, comprising a resonator with a resonator volume and a cavity, the cavity being connected to the resonator volume by way of a coupling-out line, wherein the coupling-out line has a setting facility, which can be used to influence a thermoacoustic oscillation in the coupling-out line and wherein a further resonator pipe from the resonator to the cavity is connected.

The basic principle of this device consists of a resonator, a cavity, a resonator pipe and a coupling-out pipe with setting facility, which can be used to change a thermoacoustic oscillation, in such a manner that a change for example in the frequency of the thermoacoustic oscillations brings about a change in the damping oscillations produced in the resonator. This change is such that the excitation of the resonator produces a damping oscillation, which beings about local cancellation of the thermoacoustic oscillations in the overlap region when the damping oscillation is fed back into the cavity with the aid of the resonator pipe. Such cancellation prevents the development of a standing wave at resonant frequency in the cavity and therefore damage to the cavity.

In a preferred embodiment the setting facility is a phase modifier. This can be used to set the phase of the thermoacoustic oscillation. Setting the correct phase means that the resonator is excited with the correct phase of the thermoacoustic oscillations. This is necessary to produce the damping oscillation with the correct phase matched to the thermoacoustic oscillation.

The phase modifier preferably has a means, which can be used to achieve a change in the length of the coupling-out line. The length change can be achieved in a simple manner, for example by means of a mechanical modifier attached externally to the coupling-out line, which lengthens or shortens the length of the coupling-out line in a direction intended for this purpose. Such a modifier makes the resonator particularly easy to maintain.

In a preferred embodiment the phase modifier has a means, which can be used to achieve a change in the cross section of the coupling-out line. This cross-sectional change can be achieved, like the length change, for example by means of a mechanical modifier attached externally. The resonator is particularly easy to maintain here too.

The phase modifier preferably has a means, which can be used to influence the propagation speed of the thermoacoustic oscillations in the coupling-out line. By influencing the propagation speed of the thermoacoustic oscillations it is possible to influence the excitation of the resonator, in such a manner that this has a positive impact on the damping oscillations produced in respect of cancellation of the two oscillations in the overlap region.

In a further embodiment the phase modifier has a heating element, which can be used to achieve a change in the temperature of the medium in the coupling-out line. Influencing the temperature brings about a change in the frequency of the thermoacoustic oscillations. The excitation of the resonator therefore also changes and in such a manner that it has a positive impact on the damping oscillations produced in respect of cancellation of the two oscillations in the overlap region. This can be achieved for example by specific heating or cooling of the coupling-out line. To this end the coupling-out pipe is surrounded with water for example, which can be cooled and heated quickly from outside both variably and in the event of a change in the cavity.

The phase modifier preferably has a means, which can be used to achieve a change in the pressure of the medium in the coupling-out line. The pressure change brings about a density change in the coupling-out line, which can be used to change the frequency of the thermoacoustic oscillations.

The phase modifier preferably has a means, which can be used to introduce a container with a phase-modifiable medium in the coupling-out line. It is advantageously possible then to respond quickly and effectively in the event of changes in the cavity or external influences, in that a different phase-modifying medium, for example a different liquid or gas, is used.

In a preferred embodiment the cavity is embodied as a combustion chamber. It is possible here for a flow of hot gas to be formed by burning a fuel/air mixture, said flow of hot gas then being used to generate energy.

In a preferred embodiment the device is provided in a combustion chamber, with the combustion chamber having an internal housing and an external housing that partially encloses the combustion chamber, and with the resonator being attached to the internal housing.

In an alternative embodiment the device is provided in a combustion chamber, with the combustion chamber having an internal housing and an external housing that partially encloses the combustion chamber, and with the resonator being attached to the external housing. This embodiment is particularly easy to maintain, as the resonator is accessible from outside the combustion chamber.

BRIEF DESCRIPTION OF THE DRAWINGS

The invention is described in more detail below in an exemplary manner with reference to a drawing, in which.

Identical parts have the same reference characters in all the figures.

DETAILED DESCRIPTION OF INVENTION

Figure 1:
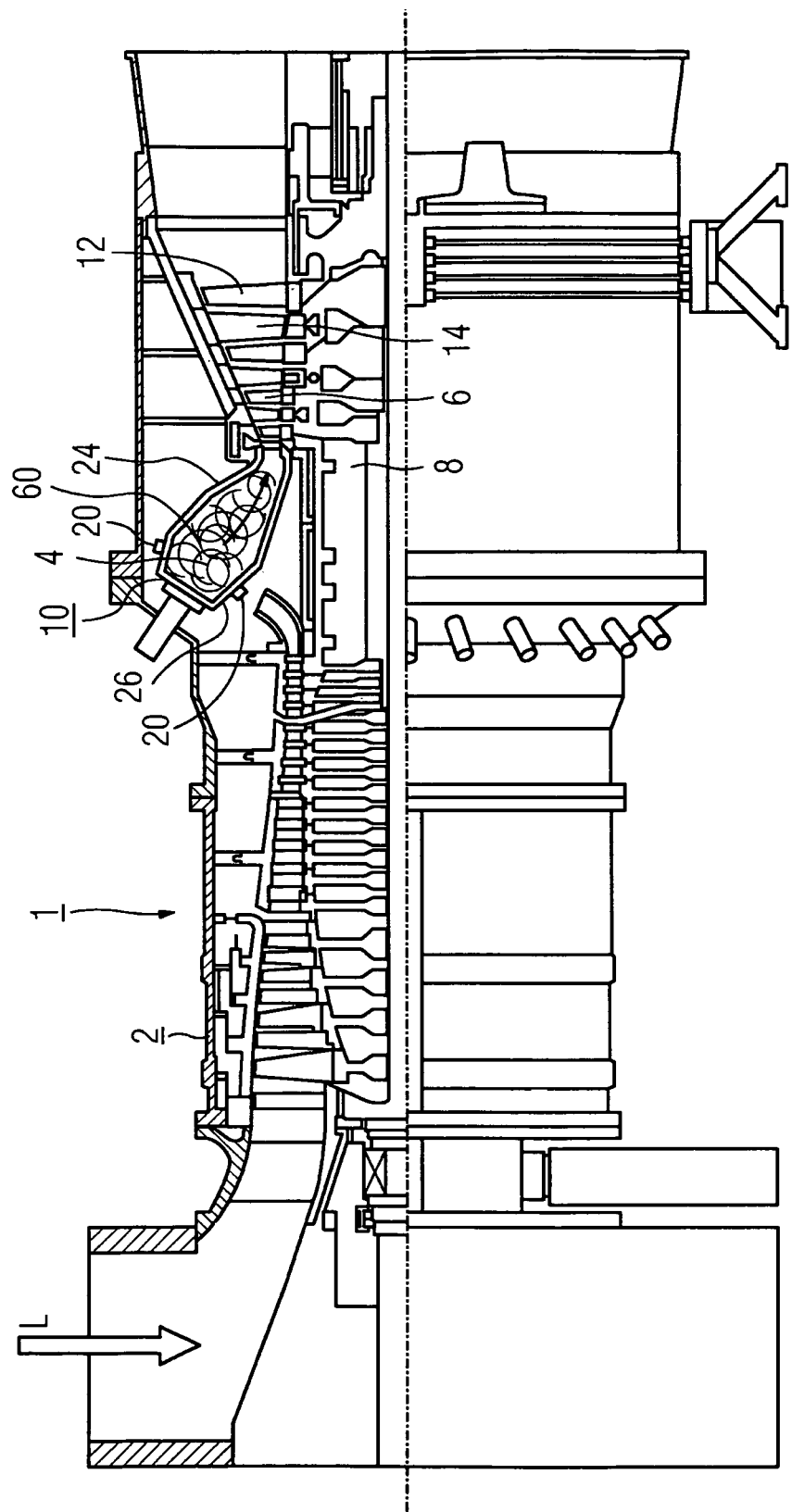
FIG. 1 shows a schematic diagram of a gas turbine.

The gas turbine 1 according to FIG. 1 has a compressor 2 for combustion air, a combustion chamber 4 and a turbine 6 to drive the compressor 2 and a generator or work machine (not shown in detail here), as well as an annular chamber 24 for transferring the hot gas M from the combustion chamber 4 to the turbine 6. Supplied air L is compressed in the compressor 2. To this end the turbine 6 and compressor 2 are arranged on a common turbine shaft 8, also referred to as a turbine rotor, to which the generator or work machine is also connected, and which is supported in a rotatable manner about its center axis. The turbine 6 has a number of rotatable blades 12 connected to the turbine shaft 8. The blades 12 are arranged in an overlapping ring shape on the turbine shaft 8, thereby forming a number of rows of blades. The turbine 6 also comprises a number of fixed vanes 14. The blades 12 serve to drive the turbine shaft 8 by pulse transmission from the hot medium flowing through the turbine 6, which is the working medium, for example the hot gas M. The vanes 14 in contrast serve to guide the flow of the working medium, for example the hot gas M.

Thermoacoustic oscillations 60 occur in the combustion chamber 4 due to combustion of a mixture. To prevent the development of a standing wave at resonant frequency, Helmholtz resonators 20 are attached to a combustion chamber housing 26 surrounding the combustion chamber 4.

Figure 2:
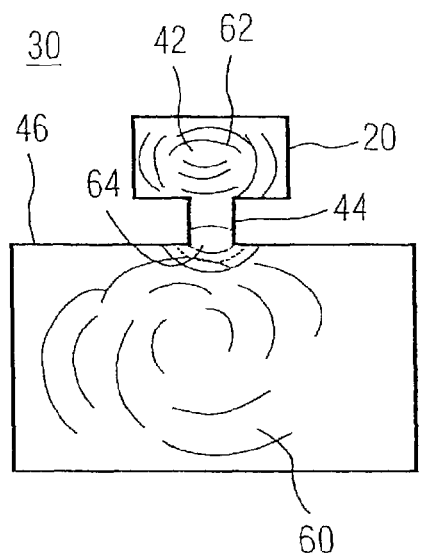
FIG. 2 shows a Helmholtz resonator according to the prior art.

FIG. 2 shows a device 30 with a Helmholtz resonator 20 according to the prior art, which can be used to damp thermoacoustic oscillations 60. The Helmholtz resonator 20 is connected to a resonator pipe 44 at a cavity 46. Thermoacoustic oscillations 60 have developed in the cavity 46, as are produced for example in a combustion chamber 4 due to combustion. The Helmholtz resonator 20 has the task of preventing the development of a standing wave at resonant frequency in the cavity 46, in that it cancels out the thermoacoustic oscillations 60 in the overlap region 64. This is done with the production of damping oscillations 62 in the resonator volume 42, which pass through the resonator pipe 62 into the cavity 46 and overlap there with the thermoacoustic oscillations 60, canceling these out. This protects the cavity 46 from damage. The Helmholtz resonator 20 here has a fixed resonant frequency, which was matched beforehand to the thermoacoustic oscillations 60. However the frequencies of the thermoacoustic oscillations 60 are displaced due to thermal interference affecting the cavity 46, for example a combustion chamber. This causes the effectiveness of the Helmholtz resonator 20 to be reduced, i.e. the thermoacoustic oscillations 60 are only slightly damped in the overlap region 64 or even show no further damping. It is therefore possible for a standing wave to develop in the cavity 46 and this can damage the cavity 46 significantly.

Figure 3:
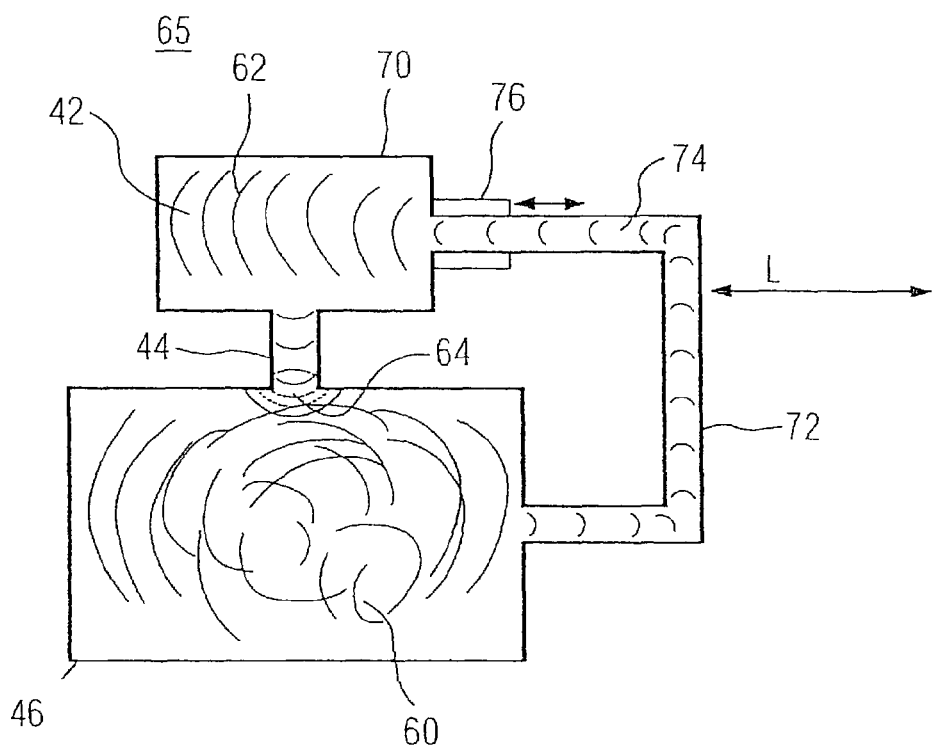
FIG. 3 shows a device and method for damping thermoacoustic oscillations according to the invention, with the method being described according to the device.

FIG. 3 shows a device 65 and a method for damping thermoacoustic oscillations 60 according to the invention, with the method being described according to the device 65. The device 65 here has a resonator 70 with a resonator volume 42, a resonator pipe 44, a cavity 46, as well as a resonator pipe 44, which connects the cavity 46 and resonator 70 and also a coupling-out line 72. The coupling-out line 72 likewise represents a connection between the resonator 70 and cavity 46. The coupling-out line 72 also has a setting facility 76. Thermoacoustic oscillations 60 develop in the cavity 46, for example a combustion chamber. The coupling-out line 72 couples out some of the thermoacoustic oscillations 74. These are fed into the resonator 70 by way of the coupling-out line 72 and the resonator 70 is thus excited.

The setting facility 76 attached to the coupling-out line 72 brings about a change in the coupled out thermoacoustic oscillations 74 in the coupling-out line 72. The setting facility 76 is a modifier for example in a direction L, which produces a change in the length of the coupling-out line 72. This controlled time delay causes the coupled out thermoacoustic oscillations 74 to excite the resonator 70 in such a manner that damping oscillations 62 develop, which are transmitted by the resonator pipe 44 into the cavity 46 and bring about cancellation of the two oscillations in the overlap region 64. If the frequency of the thermoacoustic oscillations 60 in the cavity 46 changes due to external influences, it is necessary to change the frequency of the damping oscillation 62, to achieve cancellation in the overlap region 64. This is achieved partly by the change in the thermoacoustic oscillations 60 and the changed excitation of the resonator 70 thereby induced by the coupled out oscillations 74. A further adjustment of the damping oscillation 62 to the thermoacoustic oscillation 60 in the cavity can be achieved by different settings of the setting element 76. The simple embodiment of the setting element 76 as a length-changing modifier for example is advantageous, in particular for ease of maintenance and service and is also economical.

This ensures significant cancellation of the two oscillations in the overlap region 64. The occurrence of a standing wave at resonant frequency in the cavity 46 is hereby avoided. Damage to the cavity 46 is prevented.

The subsequent matching of the resonant frequency of the resonator 70 allows a particularly diverse and reliable deployment possibility for the cavity 46, for example as a combustion chamber in prototype testing.

The invention claimed is:

1. A method of damping thermoacoustic oscillations in a cavity, comprising:
    connecting a resonator to the cavity by a resonator pipe where the resonator has a resonator volume that has a tendency toward thermoacoustic oscillation;
    inducing thermoacoustic oscillations in the cavity;
    producing damping oscillations in the resonator volume that are matched to the thermoacoustic oscillations;
    coupling at least a portion of the damping oscillations into the cavity through the resonator pipe such that the damping oscillations and thermoacoustic oscillations overlap in an overlap region wherein the overlap region exists at, an intersection of the cavity and the resonator pipe;

canceling at least a portion of the oscillations in the overlap region;

coupling at least a portion of the thermoacoustic oscillations out of the cavity by a coupling-out pipe that is separate from the resonator pipe and whose length is adjustable and coupled into the resonator volume, with the thermoacoustic oscillation in the coupling-out pipe changeable by adjusting the coupling-out pipe, wherein the thermoacoustic oscillations are induced by combustion oscillations in the cavity.

2. The method as claimed in claim 1, wherein the damping oscillations are matched in opposite phase with respect to the thermoacoustic oscillations.

3. The method as claimed in claim 2, wherein the frequency, phase and wavelength of the damping oscillations are set.

4. The method as claimed in claim 3, wherein the phase of the damping oscillations in the overlap region is set by influencing the propagation time of the thermoacoustic oscillations coupled out of the cavity.

5. The method as claimed in claim 4, wherein to achieve a temporally continuous cancellation in the overlap region, the damping oscillations are adjusted to the thermoacoustic oscillations in situ.

6. The method as claimed in claim 5, wherein the damping oscillations are set over a frequency range between 10 Hz and 400 Hz.

7. The method as claimed in claim 1, wherein the chamber is a combustion chamber.

8. The method as claimed in claim 7, wherein the chamber is a combustion chamber of a gas turbine.

9. A device for damping thermoacoustic oscillations, comprising:

a cavity capable of thermoacoustic oscillations; and a resonator having a resonator volume in communication with the cavity by a resonator pipe, wherein the cavity is also connected to the resonator volume by a coupling-out pipe that is separate from the resonator pipe and the coupling-out pipe has a setting facility, which influences a thermoacoustic oscillation in the coupling-out pipe, wherein the cavity is a combustion chamber, wherein an overlap region exists at an intersection of the cavity and the resonator pipe where a portion of damping oscillations produced in the resonator volume and coupled into the cavity and the thermoacoustic oscillations in the cavity overlap and at least partially cancel one another.

10. The device as claimed in claim 9, wherein the setting facility is a phase modifier, that sets the phase of the thermoacoustic oscillation.

11. The device as claimed in claim 10, wherein the phase modifier comprises a variable length coupling-out pipe.

* * * * *